(12) United States Patent
Rajkotia et al.

(10) Patent No.: US 8,135,015 B2
(45) Date of Patent: Mar. 13, 2012

(54) SYSTEM AND METHOD OF TRANSMITTING AND RECEIVING DATA FRAMES

(75) Inventors: Amol Rajkotia, San Diego, CA (US); Krishnan Rajamani, San Diego, CA (US); Ozgur Dural, San Diego, CA (US); Samir Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 412 days.

(21) Appl. No.: 12/413,120

(22) Filed: Mar. 27, 2009

(65) Prior Publication Data

US 2010/0246543 A1 Sep. 30, 2010

(51) Int. Cl.
*H04L 12/28* (2006.01)
(52) U.S. Cl. ................................ 370/392; 370/469
(58) Field of Classification Search .................. None
See application file for complete search history.

(56) References Cited

U.S. PATENT DOCUMENTS

| | | | |
|---|---|---|---|
| 5,130,993 A | 7/1992 | Gutman et al. | |
| 2004/0120292 A1* | 6/2004 | Trainin | 370/338 |
| 2004/0246983 A1* | 12/2004 | Kaatz | 370/432 |
| 2005/0025106 A1* | 2/2005 | Seo et al. | 370/338 |
| 2005/0068900 A1* | 3/2005 | Stephens et al. | 370/252 |
| 2005/0078598 A1* | 4/2005 | Batra et al. | 370/206 |
| 2005/0135318 A1* | 6/2005 | Walton et al. | 370/338 |
| 2006/0007908 A1* | 1/2006 | Hosur et al. | 370/350 |
| 2006/0015791 A1* | 1/2006 | Kikuchi et al. | 714/758 |
| 2007/0147284 A1 | 6/2007 | Sammour et al. | |
| 2007/0153757 A1* | 7/2007 | Kim et al. | 370/338 |
| 2007/0230454 A1* | 10/2007 | Ginzburg et al. | 370/389 |
| 2008/0025342 A1* | 1/2008 | Kim et al. | 370/468 |
| 2008/0144732 A1* | 6/2008 | Maltsev et al. | 375/260 |
| 2008/0186890 A1* | 8/2008 | Shao et al. | 370/311 |
| 2008/0219381 A1* | 9/2008 | Karaoguz et al. | 375/316 |
| 2008/0232490 A1* | 9/2008 | Gross et al. | 375/260 |
| 2009/0232124 A1* | 9/2009 | Cordeiro et al. | 370/349 |

FOREIGN PATENT DOCUMENTS

| | | |
|---|---|---|
| EP | 1059060 | 5/2009 |
| WO | 9714235 | 4/1997 |
| WO | 2008029686 | 3/2008 |

OTHER PUBLICATIONS

International Search Report, PCT/US2010/028880, International Searching Authority, European Patent Office, Jun. 24, 2010.
Written Opinion, PCT/US2010/028880, International Searching Authority, European Patent ffice, Jun. 24, 2010.

* cited by examiner

*Primary Examiner* — Phirin Sam
(74) *Attorney, Agent, or Firm* — Ashish L. Patel; Sayed H. Beladi

(57) ABSTRACT

A method of transmitting a data frame is disclosed and may include transmitting a preamble, transmitting a physical layer convergence protocol (PLCP) header, and transmitting a plurality of MAC protocol data units (MPDUs). Each MPDU may be configured to reset a convolutional decoder state after each MPDU. The method may also include transmitting an MPDU aggregation header. The MPDU aggregation header may include a count of packed MPDUs, an array of offsets, an array of lengths, a frame check sequence (FCS) for the MPDU aggregation header, a group of tail bits, or a combination thereof. Further, an end of the MPDU aggregation header may be aligned to an interleaved symbol boundary.

48 Claims, 7 Drawing Sheets

SYSTEM AND METHOD OF TRANSMITTING AND RECEIVING DATA FRAMES

CROSS-REFERENCE TO RELATED APPLICATION

The present application is related to provisional U.S. Application Ser. No. 61/164,317, entitled "METHOD AND SYSTEM FOR REDUCING HEADER INFORMATION IN WIRELESS COMMUNICATION SYSTEMS," filed on evendate herewith, and incorporated by reference herein in its entirety.

FIELD

The present invention generally relates to the operation of data networks, and more particularly, to systems and methods for transmitting and receiving data frames.

DESCRIPTION OF THE RELATED ART

Wireless local area networks (WLANs) and wireless personal area networks (WPANs) are prolific. High throughput WLAN and WPAN systems that operate at high physical layer (PHY) rates may amortize the framing overhead by using large PHY layer packets, e.g., PLCP Protocol Data Units (PPDUs). However, the probability of error increases with the size of the payload in the PPDU. For example, when a larger PPDU having an increased amount of bits therein gets dropped, due to an error in one or more of the bits, the entire PPDU is dropped and the PPDU is re-transmitted. This leads to a higher packet error rate (PER).

Therefore, what is needed is an improved system and method for transmitting data frames.

SUMMARY OF THE DISCLOSURE

A method of transmitting a data frame is disclosed and may include transmitting a preamble, transmitting a physical layer convergence protocol (PLCP) header, and transmitting a plurality of MAC protocol data units (MPDUs). Each MPDU may be configured to reset a convolutional decoder state after each MPDU. In a particular aspect, the MPDU may include an indicator to reset the convolutional decoder state after each MPDU. For example, tail bits may be used as the indicator to reset the decoder. Otherwise, a receiver may automatically reset the convolutional decoder after each MPDU per the protocol described herein. In another aspect, the command to the receiver to reset the decoder after each MPDU may be globally specified in the PLCP header. The method may also include transmitting an MPDU aggregation header.

The MPDU aggregation header may include a count of packed MPDUs, an array of offsets, an array of lengths, a frame check sequence (FCS) for the MPDU aggregation header, a group of tail bits, or a combination thereof. Further, an end of the MPDU aggregation header may be aligned to an interleaved symbol boundary.

Additionally, the method may include transmitting a header for each MPDU, transmitting a payload for each MPDU, transmitting a frame check sequence (FCS) for each MPDU, and transmitting a group of tail bits for each MPDU. The group of tail bits for each MPDU may be configured to reset the convolutional decoder state after each MPDU. The method may also include receiving an error indication for a failed MPDU and retransmitting the failed MPDU. A failed MPDU may include an MPDU that does not transmit completely, an MPDU that does not transmit at all, an MPDU that is dropped during transmission, an MPDU that is lost during transmission, an MPDU that is dropped during reception, an MPDU that is lost during reception, a corrupted MPDU, an MPDU that fails for any other reason, or a combination thereof.

In another aspect, a wireless device that is operable to transmit a data frame is disclosed. The wireless device may include means for transmitting a preamble, means for transmitting a physical layer convergence protocol (PLCP) header, and means for transmitting a plurality of MAC protocol data units (MPDUs). Each MPDU may be configured to reset a convolutional decoder state after each MPDU. Further, the wireless device may include means for transmitting an MPDU aggregation header. The MPDU aggregation header may include a count of packed MPDUs, an array of offsets, an array of lengths, a frame check sequence (FCS) for the MPDU aggregation header, a group of one or more tail bits, or a combination thereof. Also, an end of the MPDU aggregation header may be aligned to an interleaved symbol boundary. For example, in ECMA-368 the unit of operation for an interleaver may include six orthogonal frequency division multiplexing (OFDM) symbols. The interleaver may scramble the content within each unit of six symbols. If the payload is not an integral multiple of six symbols, the payload may be padded, or aligned, at the end in order for the interleaver to have full units of six symbols each with which the interleaver may work. As such, the aggregation header and the first MPDU following the aggregation header may belong to different interleaver units.

In this aspect, the wireless device may further include means for transmitting a header for each MPDU, means for transmitting a payload for each MPDU, means for transmitting a frame check sequence (FCS) for each MPDU, and means for transmitting a group of tail bits for each MPDU. The group of tail bits for each MPDU may be operable to reset the convolutional decoder state after each MPDU. The wireless device may also include means for receiving an error indication for a failed MPDU and means for retransmitting the failed MPDU.

In yet another aspect, a wireless device that is operable to transmit a data frame is disclosed and may include a processor. The processor may be operable to transmit a preamble, transmit a physical layer convergence protocol (PLCP) header, and transmit a plurality of MAC protocol data units (MPDUs). Each MPDU may be configured to reset a convolutional decoder state after each MPDU. The processor may be further operable to transmit an MPDU aggregation header. The MPDU aggregation header may include a count of packed MPDUs, an array of offsets, an array of lengths, a frame check sequence (FCS) for the MPDU aggregation header, a group of tail bits, or a combination thereof. Moreover, an end of the MPDU aggregation header may be aligned to an interleaved symbol boundary.

In this aspect, the processor may be further operable to transmit a header for each MPDU, transmit a payload for each MPDU, transmit a frame check sequence (FCS) for each MPDU, and transmit a group of tail bits for each MPDU. The group of tail bits for each MPDU may be operable to reset the convolutional decoder state after each MPDU. Further, the processor may be operable to receive an error indication for a failed MPDU and retransmit the failed MPDU.

In another aspect, a computer program product is disclosed and may include a computer-readable medium. The computer-readable medium may include at least one instruction for transmitting a preamble, at least one instruction for transmitting a physical layer convergence protocol (PLCP) header, and at least one instruction for transmitting a plurality of MAC protocol data units (MPDUs). Each MPDU may be configured to reset a convolutional decoder state after each MPDU. The computer-readable medium may also include at least one instruction for transmitting an MPDU aggregation header. The MPDU aggregation header may include a count of packed MPDUs, an array of offsets, an array of lengths, a frame check sequence (FCS) for the MPDU aggregation header, a group of tail bits, or a combination thereof. Further, an end of the MPDU aggregation header may be aligned to an interleaved symbol boundary.

In this aspect, the computer-readable medium may also include at least one instruction for transmitting a header for each MPDU, at least one instruction for transmitting a payload for each MPDU, at least one instruction for transmitting a frame check sequence (FCS) for each MPDU, and at least one instruction for transmitting a group of tail bits for each MPDU. The group of tail bits for each MPDU may be operable to reset the convolutional decoder state after each MPDU. The computer-readable medium may also include at least one instruction for receiving an error indication for a failed MPDU and at least one instruction for retransmitting the failed MPDU.

In still another aspect, a method of receiving a data frame is disclosed and may include receiving a preamble, receiving a physical layer convergence protocol (PLCP) header, and receiving a plurality of MAC protocol data units (MPDUs). Each MPDU may be configured to reset a convolutional decoder state after each MPDU and the method may include resetting the convolutional decoder state after each MPDU. The method may also include receiving an MPDU aggregation header. The MPDU aggregation header may include a count of packed MPDUs, an array of offsets, an array of lengths, a frame check sequence (FCS) for the MPDU aggregation header, a group of tail bits, or a combination thereof. Also, an end of the MPDU aggregation header may be aligned to an interleaved symbol boundary.

In this aspect, the method may include receiving a header for each MPDU, receiving a payload for each MPDU, receiving a frame check sequence (FCS) for each MPDU, and receiving a group of tail bits for each MPDU. The group of tail bits for each MPDU may be operable to reset the convolutional decoder state after each MPDU. Further, the method may include transmitting an error indication for a failed MPDU and receiving the failed MPDU again.

In yet another aspect, a wireless device that is operable to receive a data frame is disclosed. The wireless device may include means for receiving a preamble, means for receiving a physical layer convergence protocol (PLCP) header, and means for receiving a plurality of MAC protocol data units (MPDUs). Each MPDU may be configured to reset a convolutional decoder state after each MPDU and the wireless device may include means for resetting the convolutional decoder state after each MPDU. Additionally, the wireless device may include means for receiving an MPDU aggregation header. The MPDU aggregation header may include a count of packed MPDUs, an array of offsets, an array of lengths, a frame check sequence (FCS) for the MPDU aggregation header, a group of tail bits, or a combination thereof. Also, an end of the MPDU aggregation header may be aligned to an interleaved symbol boundary.

In this aspect, the wireless device may include means for receiving a header for each MPDU, means for receiving a payload for each MPDU, means for receiving a frame check sequence (FCS) for each MPDU, and means for receiving a group of tail bits for each MPDU. The group of tail bits for each MPDU may be operable to reset the convolutional decoder state after each MPDU. The wireless device may also include means for transmitting an error indication for a failed MPDU and means for receiving the failed MPDU again.

In another aspect, a wireless device that is operable to receive a data frame is disclosed and may include a processor. The processor may be operable to receive a preamble, receive a physical layer convergence protocol (PLCP) header, and receive a plurality of MAC protocol data units (MPDUs). Each MPDU may be configured to reset a convolutional decoder state after each MPDU and the processor may be operable to reset the convolutional decoder state after each MPDU. Further, the processor may be operable to receive an MPDU aggregation header. The MPDU aggregation header may include a count of packed MPDUs, an array of offsets, an array of lengths, a frame check sequence (FCS) for the MPDU aggregation header, a group of tail bits, or a combination thereof. Also, an end of the MPDU aggregation header is aligned to an interleaved symbol boundary.

In this aspect, the processor may be operable to receive a header for each MPDU, receive a payload for each MPDU, receive a frame check sequence (FCS) for each MPDU, and receive a group of tail bits for each MPDU. The group of tail bits for each MPDU may be operable to reset the convolutional decoder state after each MPDU. Moreover, the processor may be operable to transmit an error indication for a failed MPDU and receive the failed MPDU again.

In yet another aspect, a computer program product is disclosed and may include a computer-readable medium. The computer-readable medium may include at least one instruction for receiving a preamble, at least one instruction for receiving a physical layer convergence protocol (PLCP) header, and at least one instruction for receiving a plurality of MAC protocol data units (MPDUs). Each MPDU may be configured to reset a convolutional decoder state after each MPDU and the computer-readable medium may include at least one instruction for resetting the convolutional decoder state after each MPDU. The computer-readable medium may also include at least one instruction for receiving an MPDU aggregation header. The MPDU aggregation header may include a count of packed MPDUs, an array of offsets, an array of lengths, a frame check sequence (FCS) for the MPDU aggregation header, a group of tail bits, or a combination thereof. Also, an end of the MPDU aggregation header may be aligned to an interleaved symbol boundary.

In this aspect, the computer-readable medium may include at least one instruction for receiving a header for each MPDU, at least one instruction for receiving a payload for each MPDU, at least one instruction for receiving a frame check sequence (FCS) for each MPDU, and at least one instruction for receiving a group of tail bits for each MPDU. The group of tail bits for each MPDU may be operable to reset the convolutional decoder state after each MPDU. The computer-readable medium may also include at least one instruction for transmitting an error indication for a failed MPDU and at least one instruction for receiving the failed MPDU again.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
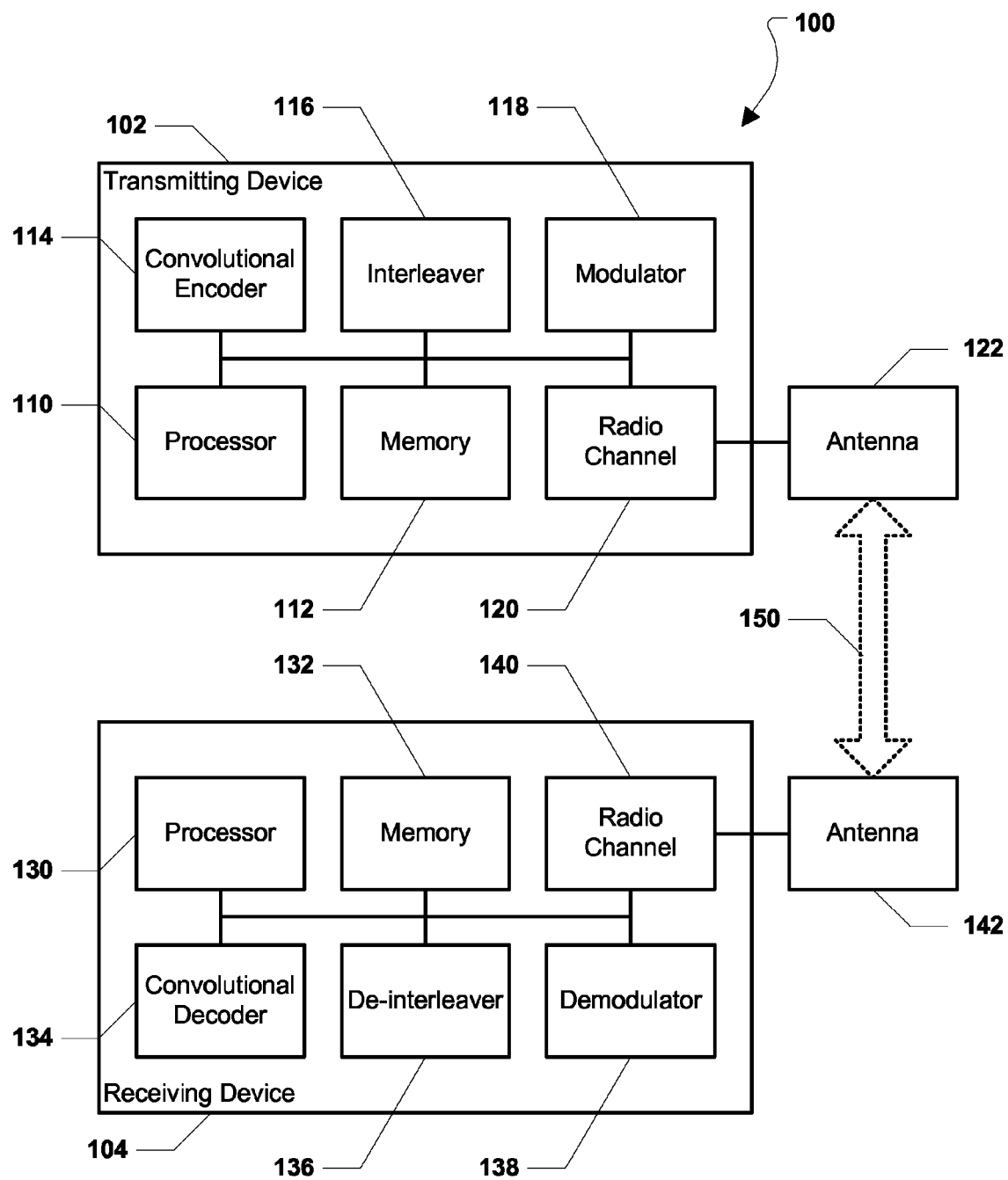
FIG. 1 is a diagram of a data network.

Referring initially to FIG. 1, a data system is shown and is generally designated 100. As shown, the system 100 may include a transmitting device 102 and a receiving device 104. The transmitting device 102 may include a processor 110 and a memory 112 coupled to the processor 110. Further, an encoder 114, e.g., a convolutional encoder, may be coupled to, or otherwise connected to, the processor 110. FIG. 1 also shows an interleaver 116 that may be coupled to, or otherwise connected to, the encoder 114 and the processor 110. Also, a modulator 118 may be coupled to, or otherwise connected to, the interleaver 116 and the processor 110. FIG. 1 indicates that a radio channel 120 may be connected to the modulator 118. Moreover, an antenna 122 may be connected to the radio channel 120.

In a particular aspect, the processor 110, the memory 112, the encoder 114, the interleaver 116, the modulator 118, the radio channel 120, the antenna 122, or a combination thereof may serve as a means for executing one or more of the method steps described herein.

As indicated in FIG. 1, the receiving device 104 may include a processor 130 and a memory 132 coupled to the processor 130. Further, a decoder 134, e.g., a convolutional decoder, may be coupled to, or otherwise connected to, the processor 130. FIG. 1 also shows a de-interleaver 136 that may be coupled to, or otherwise connected to, the decoder 134 and the processor 130. Also, a de-modulator 138 may be coupled to, or otherwise connected to, the de-interleaver 136 and the processor 130. FIG. 1 indicates that a radio channel 140 may be connected to the de-modulator 138. Moreover, an antenna 142 may be connected to the radio channel 140.

In a particular aspect, the processor 130, the memory 132, the encoder 134, the interleaver 136, the modulator 138, the radio channel 140, the antenna 142, or a combination thereof may serve as a means for executing one or more of the method steps described herein.

In a particular aspect, the transmitting device 102 may transmit frames, or data packets, to the receiving device 104. The frames may be encoded by the convolutional encoder 114 and then, interleaved by the interleaver 116. Thereafter, the frames may be passed to the modulator 118 for transmission via the radio channel 120 and the antenna 122.

The receiving device 104 may receive the frames via the antenna 142 and the radio channel 140. The frames may be transmitted from the demodulator 138 to the de-interleaver 136 to be de-interleaved. Thereafter, the frames may be decoded by the convolutional decoder 134.

Figure 2:
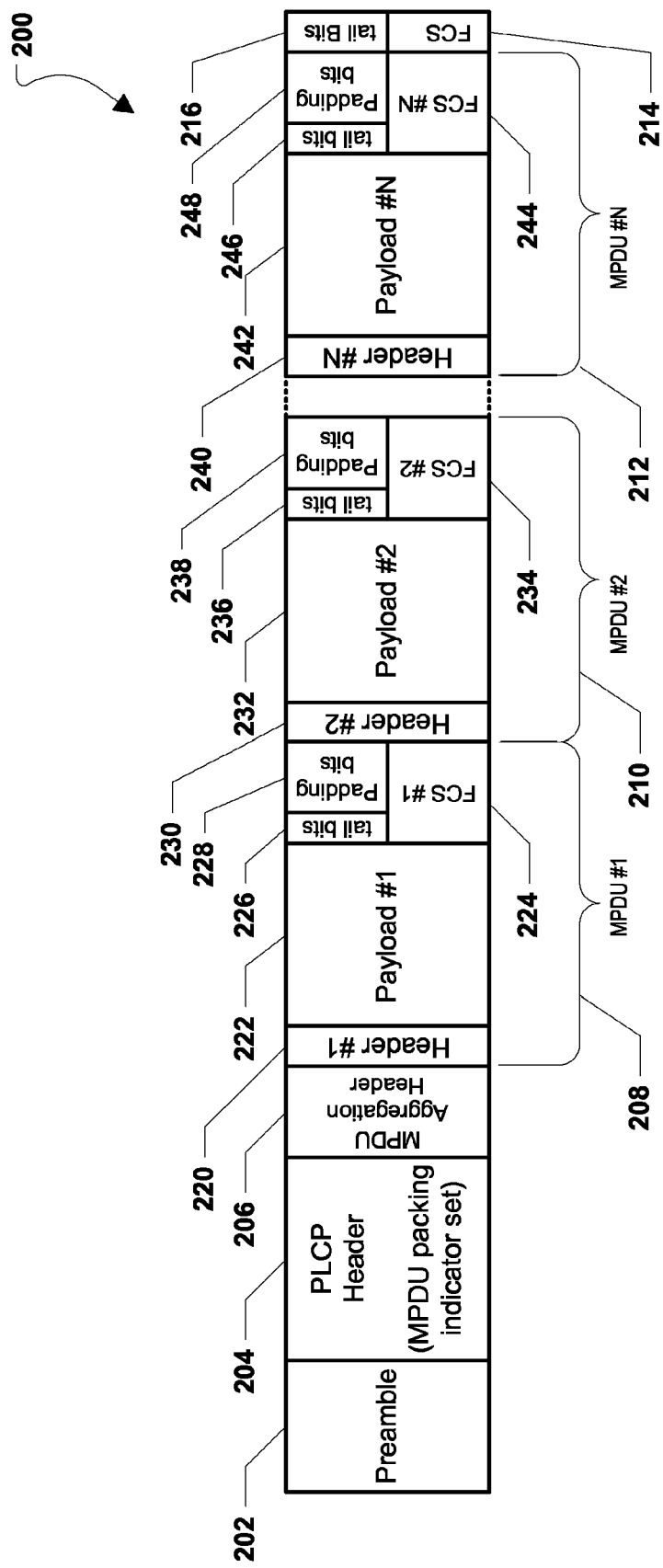
FIG. 2 is a diagram of a data frame.

Referring now to FIG. 2, an exemplary PLCP Protocol Data Unit (PPDU) frame is shown and is generally designated 200. As shown, the frame 200 may include a Physical Layer Convergence Protocol (PLCP) preamble 202, a PLCP header 204, and a MAC Protocol Data Unit (MPDU) aggregation header 206. In a particular aspect, the MPDU aggregation header 206 may be an optional element within the PPDU frame 200.

In a particular aspect, the PLCP preamble 202 may include a packet/frame synchronization sequence, a channel estimation, or a combination thereof. Further, the PLCP header 204 may include a physical layer (PHY) header, a Medium Access Control (MAC) header, a header check sequence (HCS), a group of tail bits, a group of Reed-Solomon Parity bits, or a combination thereof. In a particular embodiment, tail bits may be added between the PHY header and the MAC header, between the HCS and the Reed-Solomon parity bits, and at the end of the PLCP header. The PLCP header 204 may also include an indication that multiple MPDUs are aggregated into the payload as described herein. The MPDU aggregation header 206 may include a count of packed MPDUs, an array of offsets or lengths, a frame check sequence (FCS) for the MPDU aggregation header 206, tail bits, or a combination thereof. The end of the MPDU aggregation header 206 may be aligned to an interleaved symbol boundary.

As shown in FIG. 2, the PPDU frame 200 may further include a first MPDU 208, a second MPDU 210, and an Nth MPDU 212. Also, the PPDU frame 200 may include a PSDU FCS 214 and a group of tail bits 216. Further, in a particular aspect, the PSDU FCS 214 and the tail bits 216 may be optional.

FIG. 2 indicates that the first MPDU 208 may include a first MAC header 220, a first payload 222, a first FCS 224, and a first group of tail bits 226. The second MPDU 210 may include a second MAC header 230, a second payload 232, a second FCS 234, and a second group of tail bits 236. Also, the Nth MPDU 212 may include an Nth MAC header 240, an Nth payload 242, an Nth FCS 244, and an Nth group of tail bits 246.

Each MAC header 220, 230, 240 for each MPDU 208, 210, 212 may include one or more sequence control fields, one or more frame control fields, one or more security header fields, or a combination thereof. Each FCS 224, 234, 244 may span an individual MPDU 208, 210, 212, respectively. Each group of tail bits 226, 236, 246 may reset a convolutional decoder state at the end of each MPDU 208, 210, 212. Further, in a particular aspect, each MPDU 208, 210, 212 may be aligned, or otherwise padded to an interleaved symbol boundary, e.g., by adding one or more padding bits 228, 238, 248 to the tail bits 226, 236, 246.

Figure 3:
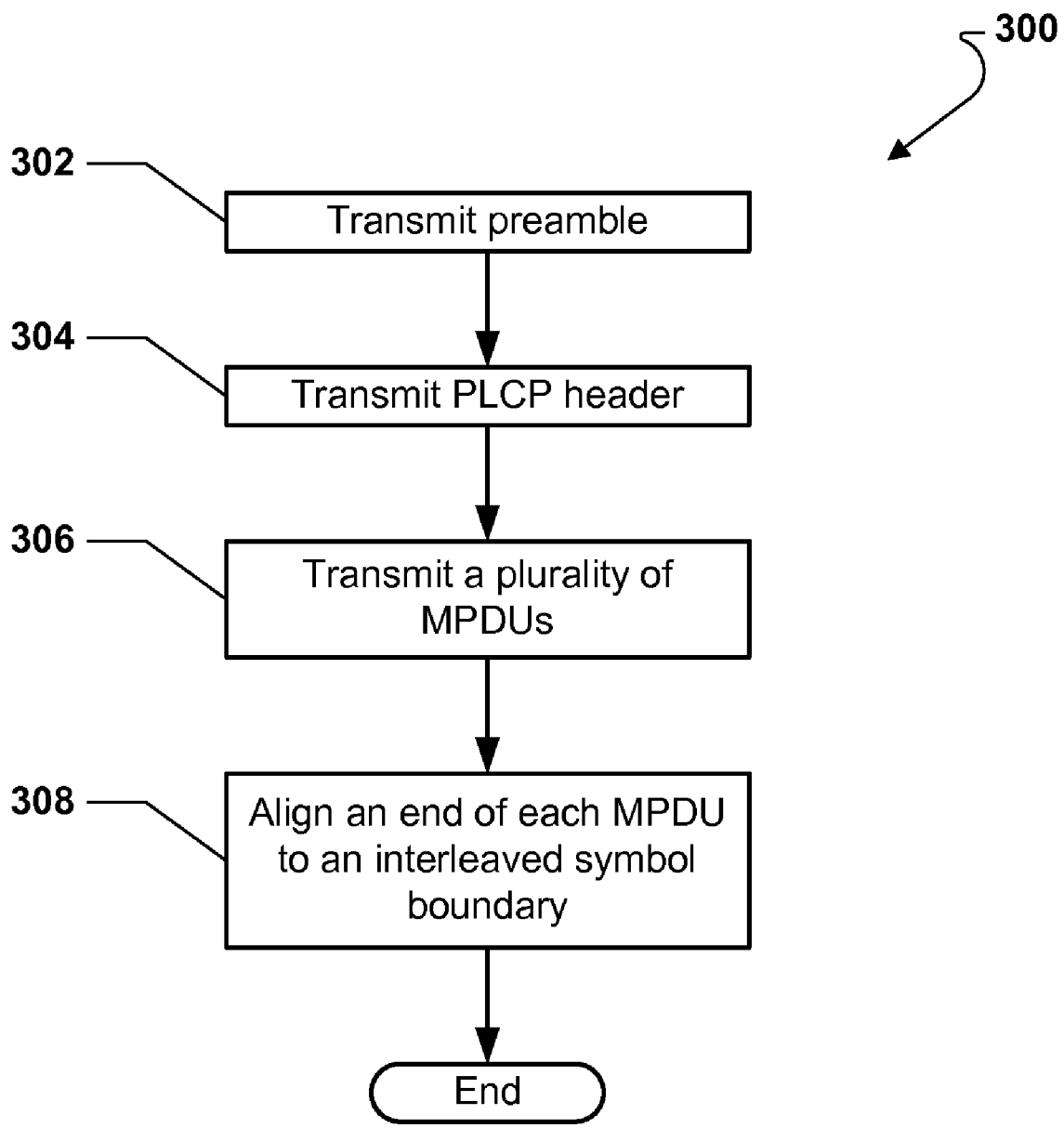
FIG. 3 is a flowchart illustrating a general method of transmitting a data frame.

FIG. 3 illustrates a general method of transmitting a data frame. The method is generally designated 300 and commences at block 302. At block 302, a preamble may be transmitted. Thereafter, at block 304, a PLCP header may be transmitted. Further, at block 306, a plurality of MPDUs may be transmitted. Each MPDU may be configured to reset a convolutional decoder state after each MPDU. Moving to block 308, an end of each of the plurality of MPDUs may be aligned to an interleaved symbol boundary. Thereafter, the method may end.

Figure 4:
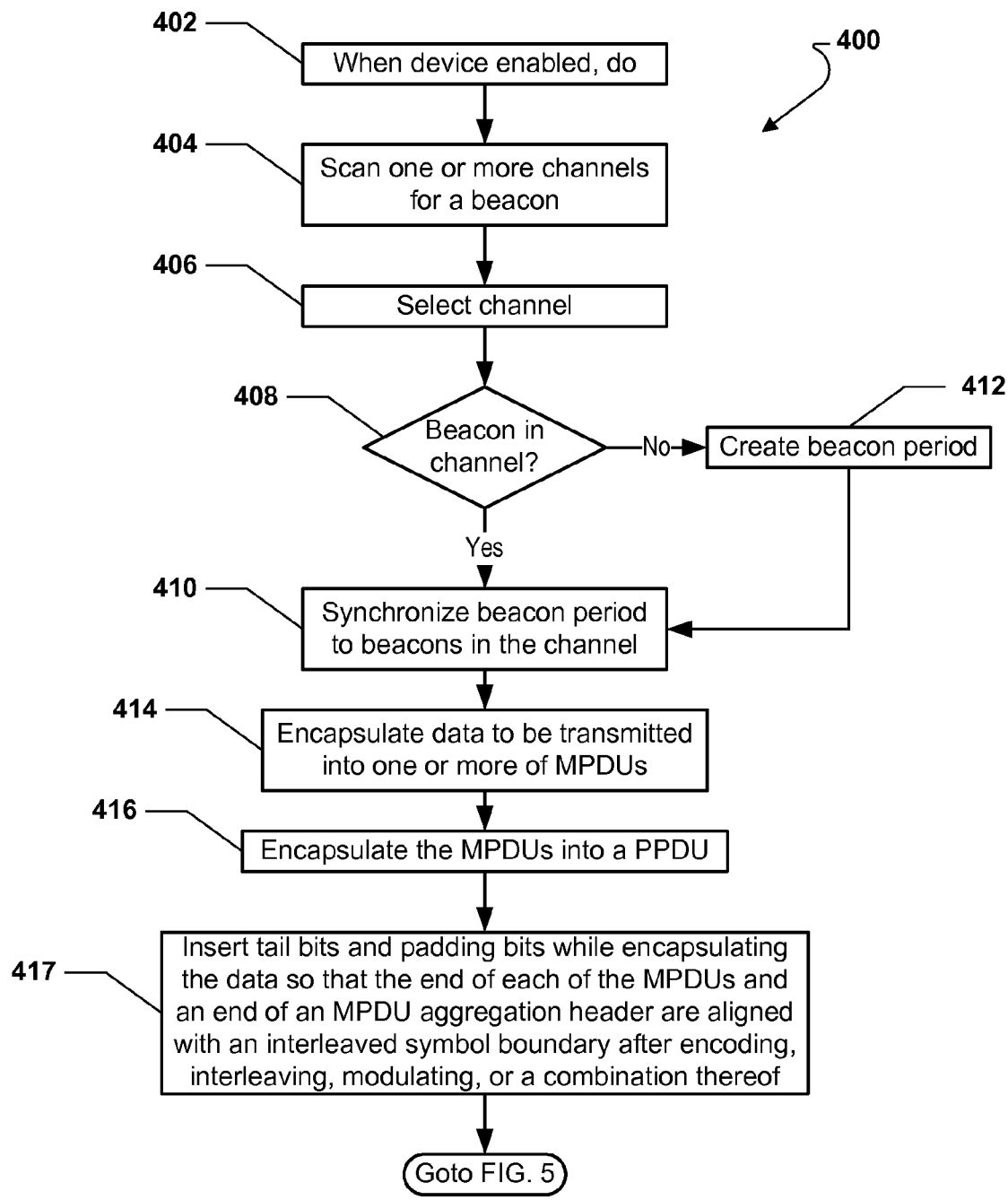
FIG. 4 is a first portion of a flowchart illustrating a detailed method of transmitting data frames.
Figure 5:
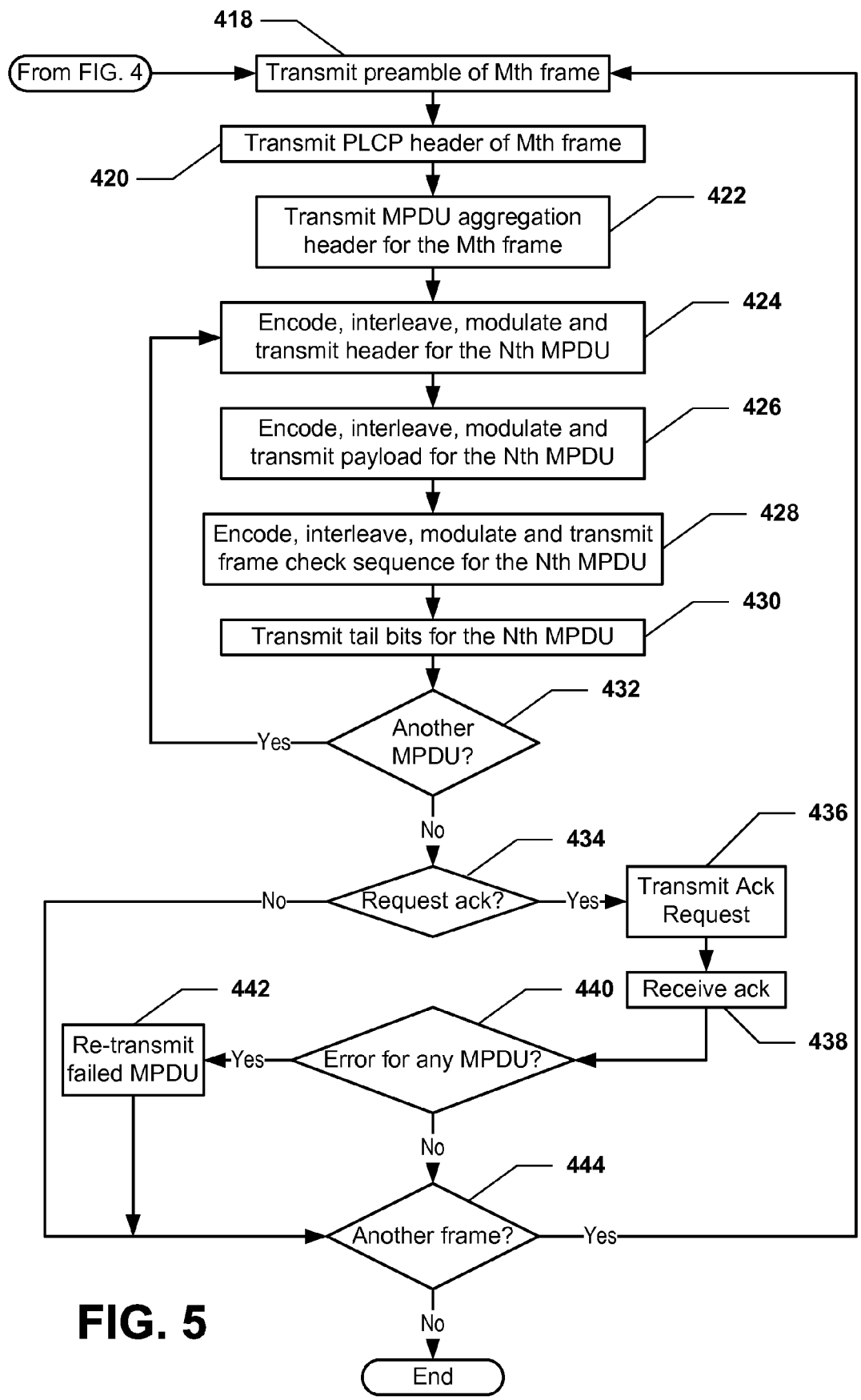
FIG. 5 is a second portion of a flowchart illustrating a detailed method of transmitting data frames.

Referring now to FIG. 4 and FIG. 5, a detailed method of transmitting frames is shown and is generally designated 400. Commencing at block 402 with a do loop, when a device is enabled, the following steps may be performed. At block 404, one or more channels may be scanned for a beacon. Further, at block 406, a channel may be selected.

Moving to decision block 408, the device may determine whether a beacon exists in the selected channel. If so, the method 400 may proceed to block 410 and the device may synchronize a beacon period to one or more beacons in the selected channel. Conversely, the method 400 may continue to block 412 and the device may create a beacon period. Thereafter, the method 400 may move to block 410 and continue as described herein. From block 410, the method 400 may continue to block 414 and data may be encapsulated data to be transmitted into one or more of MPDUs. At block 416, the one or more MPDUs may be encapsulated into a PPDU. Further, at block 417, tail bits and padding bits may be inserted while encapsulating the data so that the end of each of the MPDUs and an end of an MPDU aggregation header are aligned with an interleaved symbol boundary after encoding, interleaving, modulating, or a combination thereof. Thereafter, the method 400 may proceed to block 418 of FIG. 5.

At block 418 of FIG. 5, the device may transmit the preamble of an Mth PPDU frame. It may be appreciated that M may be an integer, e.g., 0, 1, 2, 3, 4, 5, etc. At block 420, the device may transmit a PLCP header of the Mth PPDU frame. Further, at block 422, the device may transmit an MPDU aggregation header for the Mth PPDU frame.

Moving to block 424, the device may encode, interleave, modulate and transmit a header for an Nth MPDU. It may be appreciated that N may be an integer, e.g., 0, 1, 2, 3, 4, 5, etc. Also, at block 426, the device may encode, interleave, modulate and transmit a payload for the Nth MPDU. At block 428, the device may encode, interleave, modulate and transmit a frame check sequence for the Nth MPDU. Thereafter, at block 430, the device may transmit a group of tail bits for the Nth MPDU. It may be appreciated that steps 424 through 430 may be performed in the order as shown, in another order, substantially simultaneously, or a combination thereof.

Continuing to decision 432, the device may determine whether the frame includes another MPDU. If so, the method 400 may return to block 424 and continue as described herein. Otherwise, the method 400 may move to decision 434 and determine whether to request an acknowledgement. If so, the method 400 may move to block 436 and the device may transmit an acknowledgement request to the receiving device. At block 438, the transmitting device may receive an acknowledgement from the receiving device. Thereafter, the method 400 may move to decision 440.

At decision 440, the device may determine whether an error for any particular MPDU has occurred. For example, an error may include a corrupted MPDU, an MPDU that failed delivery, a transmission error, or any other error associated with data transmission. If an error has occurred, the method 400 may continue to block 442 and the transmitting device may re-transmit the failed MPDU. Thereafter, the method 400 may move to decision 444. In a particular aspect, it is possible that an error acknowledgement may indicate that one or more MPDUs incurred an error. Further, re-transmission of any failed MPDUs may follow the same aggregated format described herein. Also, the re-transmitted frames may be optionally aggregated with new frames.

Returning to decision 440, if no error has occurred for any MPDU, the method 400 may move directly to decision 444. At decision 444, the device may determine whether the data stream includes another frame. If so, the method 400 may return to block 418 and continue as described herein. Otherwise, the method 400 may end.

Returning to decision 434, if an acknowledgement is not requested, the method 400 may proceed directly to decision 444. In one aspect, the request for the acknowledgement may be embedded in a PLCP header. In another aspect, the request may be a separate frame.

Figure 6:
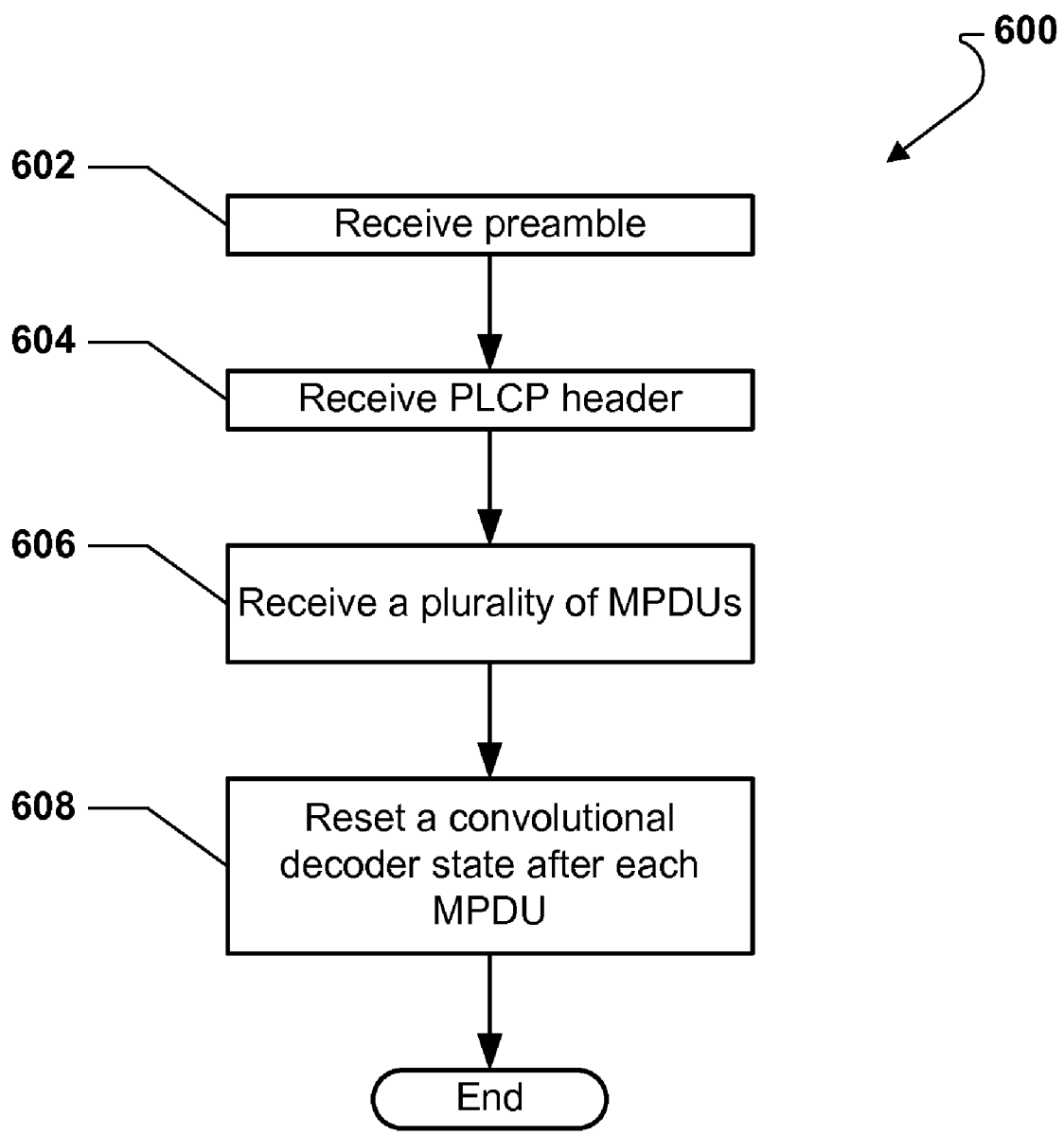
FIG. 6 is a flowchart illustrating a general method of receiving a data frame.

FIG. 6 illustrates a general method of receiving a data frame. The method is generally designated 600 and commences at block 602. At block 602, a preamble may be received. Thereafter, at block 604, a PLCP header may be received. Further, at block 606, a plurality of MPDUs may be received. Each MPDU may be configured to reset a convolutional decoder state after each MPDU. For example, each MPDU may be appended with an indication to reset a convolutional decoder state after each MPDU. Also, an end of each of the plurality of MPDUs may be aligned to an interleaved symbol boundary. Proceeding to block 608, the convolutional decoder state may be reset after each MPDU. Thereafter, the method may end.

Figure 7:
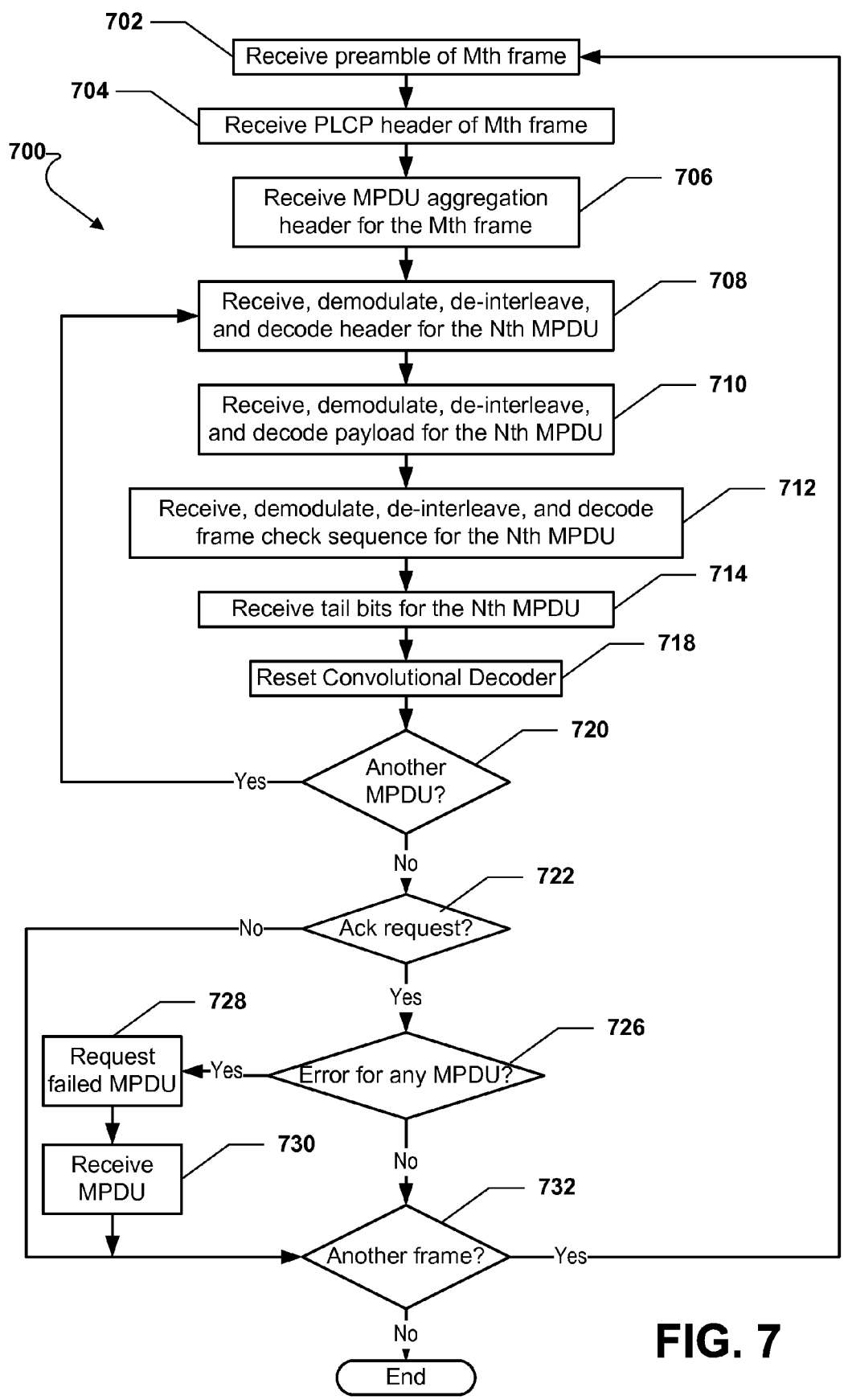
FIG. 7 is a flowchart illustrating a detailed method of receiving data frames.

Referring now to FIG. 7, a detailed method of receiving frames is shown and is generally designated 700. Beginning at block 702, a receiving device may receive the preamble of an Mth frame. It may be appreciated that M may be an integer, e.g., 0, 1, 2, 3, 4, 5, etc. At block 704, the device may receive a PLCP header of the Mth frame. Further, at block 706, the device may receive an MPDU aggregation header for the Mth frame.

Proceeding to block 708, the device may receive, demodulate, de-interleave, and decode a header for an Nth MPDU. It may be appreciated that N may be an integer, e.g., 0, 1, 2, 3, 4, 5, etc. At block 710, the device may receive, demodulate, de-interleave, and decode a payload for the Nth MPDU. At block 712, the device may receive, demodulate, de-interleave, and decode a frame check sequence for the Nth MPDU. Further, at block 714, the device may receive a group of tail bits for the Nth MPDU. It may be appreciated that steps 708 through 714 may be performed in the order as shown, in another order, substantially simultaneously, or a combination thereof. Further, at block 718, the device may reset a convolutional decoder based on the reception of the tail bits associated with the Nth MPDU.

Continuing to decision 720, the device may determine whether the frame includes another MPDU. If so, the method 700 may return to block 708 and continue as described herein. Otherwise, the method 700 may move to decision 722 and determine whether an acknowledgement request is received. If so, the method 700 may move to decision 726.

At decision 726, the device may determine whether an error for any particular MPDU has occurred. If an error has occurred, the method 700 may continue to block 728 and the device may transmit an acknowledgement to the transmitting device that may include a request for re-transmission of the failed MPDU, or MPDUs. Thereafter, the method 700 may proceed to block 730 and the device may receive the MPDU, or MPDUs that have been re-transmitted. The method 700 may then move to decision 732.

Returning to decision 726, if no error has occurred for any MPDU, the method 700 may move directly to decision 732. At decision 732, the device may determine whether the data stream includes another frame. If so, the method 700 may return to block 702 and continue as described herein. Otherwise, the method 700 may end. Returning to decision 722, if an acknowledgement is not requested, the method 700 may proceed directly to decision 732 and continue as described herein.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, some method steps may be performed substantially simultaneously.

One or more aspects described herein provide a system and method for transmitting/receiving data packets. A plurality of MPDUs may be aggregated within a PPDU. The system and method provides full isolation of packet error rate (PER) for each of the aggregated MPDUs by providing that the decoder and interleaver states do not straddle MPDU boundaries. Accordingly, when a particular MPDU includes an error due to one or more bits therein, that particular MPDU may be re-transmitted without having to transmit the other MPDUs aggregated within the PPDU. As such, the PER for the failed MPDU is isolated to that MPDU.

It may be appreciated that the system and method described herein may be utilized in various high throughput WLAN and WPAN systems. For example, the system and method herein may be utilized in an 802.11n system, an ECMA-368 system, or some other WLAN or WPAN system well known in the art.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations can be made therein without departing from the spirit and scope of the present invention, as defined by the following claims.

What is claimed is:

1. A method of transmitting a data frame, the method comprising:
   transmitting a preamble;
   transmitting a physical layer convergence protocol (PLCP) header; and
   transmitting a plurality of MAC protocol data units (MPDUs), wherein each MPDU includes an indication for a receiver to reset a convolutional decoder state after that MPDU.

2. The method of claim 1, wherein an end of each MPDU is aligned to an interleaved symbol boundary.

3. The method of claim 1, further comprising:
   transmitting an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

4. The method of claim 3, wherein an end of the MPDU aggregation header is aligned to an interleaved symbol boundary.

5. The method of claim 1, further comprising:
   transmitting a header for each MPDU;
   transmitting a payload for each MPDU;
   transmitting a frame check sequence (FCS) for each MPDU; and
   transmitting a group of tail bits for each MPDU, wherein the group of tail bits for each MPDU is operable to reset the convolutional decoder state after each MPDU.

6. The method of claim 1, further comprising:
   receiving an error indication for a failed MPDU; and
   retransmitting the failed MPDU.

7. A wireless device operable to transmit a data frame, the wireless device comprising:
   means for transmitting a preamble;
   means for transmitting a physical layer convergence protocol (PLCP) header; and
   means for transmitting a plurality of MAC protocol data units (MPDUs), wherein each MPDU includes an indication for a receiver to reset a convolutional decoder state after that MPDU.

8. The wireless device of claim 7, wherein an end of each MPDU is aligned to an interleaved symbol boundary.

9. The wireless device of claim 7, further comprising:
   means for transmitting an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

10. The wireless device of claim 9, wherein an end of the MPDU aggregation header is aligned to an interleaved symbol boundary.

11. The wireless device of claim 7, further comprising:
means for transmitting a header for each MPDU;
means for transmitting a payload for each MPDU;
means for transmitting a frame check sequence (FCS) for each MPDU; and
means for transmitting a group of tail bits for each MPDU, wherein the group of tail bits for each MPDU is operable to reset the convolutional decoder state after each MPDU.

12. The wireless device of claim 7, further comprising:
means for receiving an error indication for a failed MPDU; and
means for retransmitting the failed MPDU.

13. A wireless device operable to transmit a data frame, the wireless device comprising:
a processor, wherein the processor is operable to:
transmit a preamble;
transmit a physical layer convergence protocol (PLCP) header; and
transmit a plurality of MAC protocol data units (MPDUs), wherein each MPDU includes an indication for a receiver to reset a convolutional decoder state after that MPDU.

14. The wireless device of claim 13, wherein an end of each MPDU is aligned to an interleaved symbol boundary.

15. The wireless device of claim 13, wherein the processor is further operable to:
transmit an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

16. The wireless device of claim 15, wherein an end of the MPDU aggregation header is aligned to an interleaved symbol boundary.

17. The wireless device of claim 13, wherein the processor is further operable to:
transmit a header for each MPDU;
transmit a payload for each MPDU;
transmit a frame check sequence (FCS) for each MPDU; and
transmit a group of tail bits for each MPDU, wherein the group of tail bits for each MPDU is operable to reset the convolutional decoder state after each MPDU.

18. The wireless device of claim 13, wherein the processor is further operable to:
receive an error indication for a failed MPDU; and
retransmit the failed MPDU.

19. A non-transitory computer-readable medium comprising:
at least one instruction for transmitting a preamble;
at least one instruction for transmitting a physical layer convergence protocol (PLCP) header; and
at least one instruction for transmitting a plurality of MAC protocol data units (MPDUs), wherein each MPDU includes an indication for a receiver to reset a convolutional decoder state after that MPDU.

20. The non-transitory computer-readable medium of claim 19, wherein an end of each MPDU is aligned to an interleaved symbol boundary.

21. The non-transitory computer-readable medium of claim 19, wherein the computer-readable medium further comprises:
at least one instruction for transmitting an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

22. The non-transitory computer-readable medium of claim 21, wherein an end of the MPDU aggregation header is aligned to an interleaved symbol boundary.

23. The non-transitory computer-readable medium of claim 19, wherein the computer-readable medium further comprises:
at least one instruction for transmitting a header for each MPDU;
at least one instruction for transmitting a payload for each MPDU; at least one instruction for transmitting a frame check sequence (FCS) for each MPDU; and at least one instruction for transmitting a group of tail bits for each MPDU, wherein the group of tail bits for each MPDU is operable to reset the convolutional decoder state after each MPDU.

24. The non-transitory computer-readable medium of claim 19, wherein the computer-readable medium further comprises:
at least one instruction for receiving an error indication for a failed MPDU; and at least one instruction for retransmitting the failed MPDU.

25. A method of receiving a data frame, the method comprising:
receiving a preamble;
receiving a physical layer convergence protocol (PLCP) header;
receiving a plurality of MAC protocol data units (MPDUs), wherein each MPDU includes an indication to reset a convolutional decoder state after that MPDU; and
resetting the convolutional decoder state after each MPDU.

26. The method of claim 25, wherein an end of each MPDU is aligned to an interleaved symbol boundary.

27. The method of claim 25, further comprising:
receiving an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

28. The method of claim 27, wherein an end of the MPDU aggregation header is aligned to an interleaved symbol boundary.

29. The method of claim 25, further comprising:
receiving a header for each MPDU;
receiving a payload for each MPDU;
receiving a frame check sequence (FCS) for each MPDU; and
receiving a group of tail bits for each MPDU, wherein the group of tail bits for each MPDU is operable to reset the convolutional decoder state after each MPDU.

30. The method of claim 25, further comprising:
transmitting an error indication for a failed MPDU; and
receiving the failed MPDU.

31. A wireless device operable to receive a data frame, the wireless device comprising:
means for receiving a preamble;
means for receiving a physical layer convergence protocol (PLCP) header;
means for receiving a plurality of MAC protocol data units (MPDUs), wherein each MPDU includes an indication to reset a convolutional decoder state after that MPDU; and means for resetting the convolutional decoder state after each MPDU.

32. The wireless device of claim 31, wherein an end of each MPDU is aligned to an interleaved symbol boundary.

33. The wireless device of claim 31, further comprising:
means for receiving an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

34. The wireless device of claim 33, wherein an end of the MPDU aggregation header is aligned to an interleaved symbol boundary.

35. The wireless device of claim 31, further comprising:
means for receiving a header for each MPDU;
means for receiving a payload for each MPDU;
means for receiving a frame check sequence (FCS) for each MPDU; and
means for receiving a group of tail bits for each MPDU, wherein the group of tail bits for each MPDU is operable to reset the convolutional decoder state after each MPDU.

36. The wireless device of claim 31, further comprising:
means for transmitting an error indication for a failed MPDU; and
means for receiving the failed MPDU.

37. A wireless device operable to receive a data frame, the wireless device comprising:
a processor, wherein the processor is operable to:
receive a preamble;
receive a physical layer convergence protocol (PLCP) header;
receive a plurality of MAC protocol data units (MPDUs), wherein each MPDU includes an indication to reset a convolutional decoder state after that MPDU; and
reset the convolutional decoder state after each MPDU.

38. The wireless device of claim 37, wherein an end of each MPDU is aligned to an interleaved symbol boundary.

39. The wireless device of claim 37, wherein the processor is further operable to:
receive an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

40. The wireless device of claim 39, wherein an end of the MPDU aggregation header is aligned to an interleaved symbol boundary.

41. The wireless device of claim 37, wherein the processor is further operable to:
receive a header for each MPDU;
receive a payload for each MPDU;
receive a frame check sequence (FCS) for each MPDU; and
receive a group of tail bits for each MPDU, wherein the group of tail bits for each MPDU is operable to reset the convolutional decoder state after each MPDU.

42. The wireless device of claim 37, wherein the processor is further operable to: transmit an error indication for a failed MPDU; and receive the failed MPDU.

43. A non-transitory computer-readable medium comprising:
at least one instruction for receiving a preamble;
at least one instruction for receiving a physical layer convergence protocol (PLCP) header;
at least one instruction for receiving a plurality of MAC protocol data units (MPDUs), wherein each MPDU includes an indication to reset a convolutional decoder state after that MPDU; and
at least one instruction for resetting the convolutional decoder state after each MPDU.

44. The non-transitory computer-readable medium of claim 43, wherein an end of each MPDU is aligned to an interleaved symbol boundary.

45. The non-transitory computer-readable medium of claim 43, wherein the computer-readable medium further comprises:
at least one instruction for receiving an MPDU aggregation header, wherein the MPDU aggregation header includes a count of packed MPDUs, an array of offsets, an array of lengths, a frame check sequence (FCS) for the MPDU aggregation header, a group of tail bits, or a combination thereof.

46. The non-transitory computer-readable medium of claim 45, wherein an end of the MPDU aggregation header is aligned to an interleaved symbol boundary.

47. The non-transitory computer-readable medium of claim 43, wherein the computer-readable medium further comprises:
at least one instruction for receiving a header for each MPDU;
at least one instruction for receiving a payload for each MPDU;
at least one instruction for receiving a frame check sequence (FCS) for each MPDU; and
at least one instruction for receiving a group of tail bits for each MPDU, wherein the group of tail bits for each MPDU is operable to reset the convolutional decoder state after each MPDU.

48. The non-transitory computer-readable medium of claim 43, wherein the computer-readable medium further comprises:
at least one instruction for transmitting an error indication for a failed MPDU; and at least one instruction for receiving the failed MPDU.

* * * * *